UNITED STATES PATENT OFFICE.

GEORGE MAHLON ABSALOM, OF CAISTORVILLE, ONTARIO, CANADA.

TRANSMISSION DEVICE FOR TRACTORS.

1,243,912. Specification of Letters Patent. Patented Oct. 23, 1917.

Application filed March 21, 1914. Serial No. 826,140.

*To all whom it may concern:*

Be it known that I, GEORGE MAHLON ABSALOM, of the village of Caistorville, in the county of Lincoln, in the Province of Ontario, Canada, have invented certain new and useful Improvements in Transmission Devices for Tractors, of which the following is the specification.

My invention relates to improvements in transmission devices for tractors, and the object of the invention is to construct a tractor provided with driving connections to each wheel which will be more efficient than those at present in use; a further object is to devise a transmission device having driving connections to front and rear wheels in which the front axle can be turned bodily as is the case in the ordinary steam or motor tractors at present in use; a further object is to construct a transmission device for a tractor in which the gears or sprockets and chains are constantly in an operative connection; a still further object is to construct a transmission device having friction clutches applied to each wheel, and independent friction clutches applied to the low speed and high speed sprockets and also to the reverse gear; another object is to provide means for releasing each pair of wheel friction clutches (the friction clutches on each front and rear wheel) independently or in unison; and another object is to provide means for disconnecting the power on the front wheels when it is desired to reverse the tractor.

My invention consists of a transmission device for tractors having means for driving the front and back wheels, friction clutches connected to each wheel, means for actuating each pair of front and rear wheel friction clutches independently or in unison, means for providing variable speed connections to the front and rear wheels, said means being constantly in an operative connection, independent friction clutches for controlling each speed and the reverse, and means for disconnecting the power from the front wheels upon reversal of the tractor, all as hereinafter more particularly described and illustrated in the accompanying drawings in which:—

Like characters of reference indicate corresponding parts in the different views.

1, 1 are the side bars of the chassis frame. 2, 2 are cross bars thereof. 3, 3 are the rear wheels. 4 is a depending sub-frame connected to the chassis frame. 5 is the rear axle adapted to be revolubly mounted on the sub-frame 4. 6 is the engine, which, in the present instance is of the internal combustion type. 7 is a sub-frame upon which the engine is mounted. 8 is the fly wheel of the engine. 9 is a shaft extending crosswise of the tractor from the crank shaft of the engine on one side, and 10 is a shaft extending crosswise of the tractor from the fly wheel of the engine. 11 is a pulley wheel releasably connected to the shaft 10 by the friction clutch 12.

13 is a shaft extending crosswise of the depending frame and journaled in suitable bearings 14 mounted thereon. 15 is a small sprocket wheel rigidly mounted on the shaft 9 exteriorly of the side bars 1 of the chassis frame. 16 is a sprocket wheel situated exteriorly of one of the side bars 1 of the chassis frame and releasably connected to the cross shaft 13 by the friction clutch 17, said sprocket wheel 16 being in line with the aforesaid sprocket wheel 15. 18 is a chain connecting the two sprocket wheels together. 19 is a sprocket wheel rigidly mounted on the shaft 9, said sprocket wheel being of larger diameter than the sprocket wheel 15, and 20 is a sprocket wheel releasably connected to the cross shaft 13 by the friction clutch 21 and being in line with the sprocket wheel 19. 22 is a chain connecting the sprocket wheels 19 and 20 together. 23 is a pinion keyed to the shaft 10, and 24 is a gear releasably connected to the cross shaft 13 by the friction clutch 25.

26 and 27 are respectively the left and right friction clutches on the rear wheels 3. 28, 28, are the front wheels. 29 and 30 are friction clutches connected respectively to the left and right front wheels 28.

31 is a sprocket wheel keyed to the shaft 5, and 32 is a small sprocket wheel keyed to the cross shaft 13, said sprocket wheel 32 being in alinement with the sprocket wheel 31 and connected thereto by the chain 33.

34 is a longitudinal shaft extending to the front wheels and revolubly mounted at its rear end on a cross bar 35 and at its front end on a cross bar 36. 37 is a bevel gear keyed to the rear end of the shaft 34 and meshing with a bevel gear 38 keyed to the cross shaft 13. 39 is a double bevel gear freely mounted on the cross shaft 13, the teeth on one side 40 thereof meshing with the teeth of the bevel gear 37, and the teeth on the side 41 thereof meshing with an idle bevel gear 42 keyed to a suitably supported longitudinal shaft 43. 44 is a bevel gear keyed to the shaft 13 and meshing with the idler gear 42 on the side remote from where the side 41 of the gear 39 engages.

45 is the front axle revolubly mounted on the arched cross frame 46 in bearings 47. 48 is a downwardly curved semi-circular cross bar attached at each end to the side bars 1 of the frame. 49 is a longitudinally extending yoke with depending ends, the forward end being pivotally connected to the cross bar 48, and the rear end provided with a bearing 50 at its lower end through which the longitudinal shaft 34 freely extends.

51 is a vertical shaft rigidly supported at its lower end in a boxing 52 which is freely mounted on the front axle 45. The vertical shaft 51 extends up through the arched frame 46 and through the yoke 49 to a cross bar of the chassis frame. 53 is a large bevel gear free on the shaft 51 and carrying on its under side the small bevel gear 54. 55 is a bevel gear freely mounted on the front axle 45 and having the outwardly extending hub 56. The bevel gear is provided with a hollow boss 57 on the side of the gear remote from the hub 56, said boss having internal teeth 58. 59 is a collar secured to the front axle 45 by the key 60 and having an enlarged annular portion 61 adapted to extend into the interior of the hollow boss 57. 62, 62 are cut-away portions in the enlarged portion, and 63, 63 are pawls adapted to be held against the teeth 58 by the springs 64. 65 is a double bevel gear free on the vertical shaft 51, and 66 is a bevel gear meshing at the bottom with the upper face 65$^a$ of the gear 65 and at the top with a small bevel gear 54. 67 is a bevel gear loosely mounted on the front axle 45 and designed to mesh with the lower face 65$^b$ of the double bevel gear 65. The bevel gear 67 is provided with a hollow boss 57 having ratchet teeth identical to that already described in connection with the gear 55. A collar 59 secured to the front axle 45 by the key 60 and having an enlarged annular portion with cut-away portions and pivotally connected pawls is also provided. In fact the ratchet mechanism is identical in construction to that already described. 68, 68 are the hubs of the front wheels 28, said wheels being freely mounted on the axle 45 and secured thereon by any suitable means such as the collar 69. 70 is an annular member suitably secured to each wheel and having the inwardly extending rim 71 formed on the outside periphery thereof. 72 is a bushing secured to the front axle 45 by the key 73 and provided with outwardly extending bracket arms 74 having turned in ends 75, the inner edge of which comes into proximity with the rim 71. 76 is a friction band divided into two portions, one end of each portion having a looped end 77 secured to the corresponding bracket arm 74 by the pin 78. 79, 79 are bell crank levers pivotally connected to each bracket arm 74 by the pins 80, the lower end of each bell crank lever being pivotally connected to the corresponding free end of the divided portions of the friction band 76. 81 is a collar loosely mounted on the bushing 72 and provided with suitably spaced annular flanges 82 forming a groove between them. 83 is a collar inserted into said groove and movable freely in relation thereto. 84 is a forked arm extending around the half of the collar and pivotally connected to the collar 83 by the pins 85. 86, 86 are suitably spaced studs formed on the bearings 47, the forked arms being designed to be pivotally connected between the said studs. 87, 87 are L-shaped levers pivotally connected at their inner ends to the collar 81 and also pivotally connected to studs 88 on the inner faces of the bracket arms. The feet 87$^a$ of the L-shaped levers extend through slots 89 in the bracket arms and also through the free ends of the bell crank levers. 90, 90 are guides for keeping the levers in alinement.

While I have described one friction clutch which is shown in the drawings as applied to the left hand front wheel it is to be understood that all the friction clutches on both front and rear wheels are constructed in the identical manner as that shown and described with exception that their position is reversed as occasion demands.

91 is a cross shaft suitably mounted in any desired position on the sub-frame 4. 92 is a bushing secured thereto by the key 93 and having the outwardly extending arms 94 provided on their outer faces with pins 95. 96 is a second bushing freely mounted on the cross shaft 91 and held thereon by the collar 97 and secured to the shaft by the pin 98. 99, 99 are outwardly extending arms formed on the bushing 96 and provided on their outer faces with the pins 100. 101 is a forwardly extending lever secured to or formed on the bushing 92, and 102 is the second forwardly extending lever secured to or formed on the bushing 96. 103, 103 are rods, each pivotally connected at one end by the pins 95 to the respective arms 94. The other ends of the rods 103 are pivotally connected to the forked levers 84 which control the friction bands. It is to be understood that these rods connect to the front and rear of the friction cluches on the right hand wheels, the upper of the rods connecting to the front forked rod, and the lower to the rear forked rod. 104, 104 are rods pivotally connected at one end of each to the arms 94 by the pins 95. Their other ends are connected to the forked arms of the front and rear friction clutches of the left hand wheels, the upper rod 104 being connected to the forked rod of the front friction clutch, and the lower rod 104 being connected to the forked rod of the rear friction clutch. 105 is the lever suitably mounted on a stub shaft 106 which is suitably mounted in any desired position on the chassis. 107 is an extension of the lever 105, said extension being at an angle thereto. 108 is a rod pivotally connected at one end to the extension 107 of the lever 105 and at the other end to the lever 101. This lever 105 controls the front and rear friction clutches of the right hand wheels. 109 is a lever pivotally supported on the stub shaft 106 and having the offset extension 110. 111 is a rod pivotally connected at one end to the offset extension 110 and at the other end to the lever 102. 112 is a toothed quadrant secured to the lever 109, and 113 is a spring actuated pawl adapted to engage the teeth 112ª of the toothed quadrant 112, said spring actuated pawl 113 being secured to the lever 105. 114 is a spring actuated pawl suitably secured to the lever 109 and adapted to engage the teeth 115ª of the toothed quadrant 115.

Figure 5:
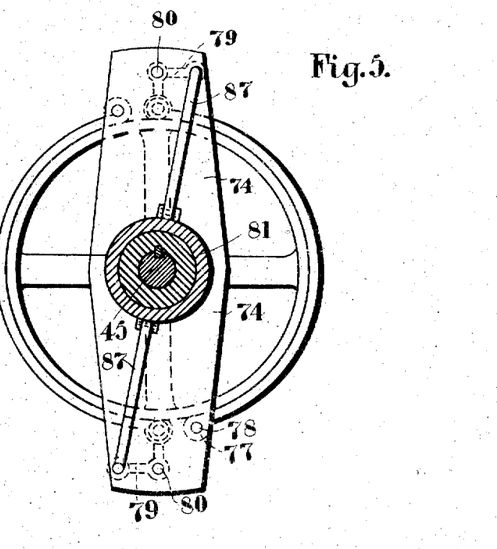
Fig. 5 is an elevational detail of one of the friction clutches.

It is also to be understood that the friction clutches 12, 17, 21 and 25 are similar in construction to the friction clutch shown in Fig. 5 of the drawings and consequently details thereof have not been shown.

The operation of the device is as follows:—

Figures 6, 7:
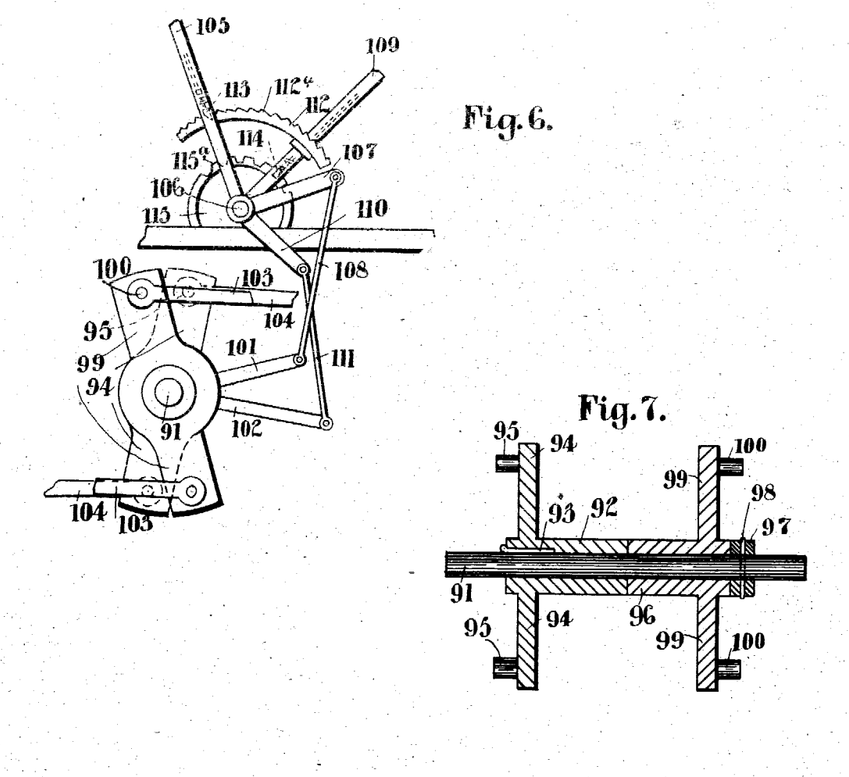
Fig. 6 is a side elevation of the means for controlling the respective friction clutches.
Fig. 7 is a cross section thereof.
Figure 8:
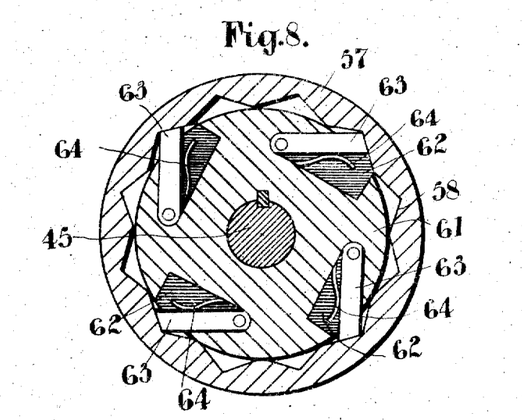
Fig. 8 is a sectional detail of one of the ratchets applied to the front axle.

Assuming that the wheel friction clutches are in the inoperative position I will first describe the means of throwing them into engagement. When all the wheel friction clutches are running loose the lever 105 coincides with the lever 109 and it is normally locked thereto by the pawl 113 engaging the toothed quadrant 112. By pulling over the lever 109 the four friction clutches are thrown into engagement. It will be seen that when this lever 109 is pulled over extension 110 is drawn upward, and consequently by means of the rods 108 and 111 the levers 101 and 102 which are respectively connected to the bushings 92 and 96 are turned upward. When these bushings are turned together in a counter clockwise direction the upper rods 103 and 104 are pulled rearwardly and the lower rods 103 and 104 are pulled forwardly. When the upper rods 103 and 104 are pulled rearwardly the inner ends of the forked arms 84 are pulled rearwardly and as the forked rods are connected to the rings 83, which in turn are freely mounted on the collars 81, such collars are pushed inwardly toward the bearings 47 of the arched frame 46. When this takes place the lower ends of the levers 87 which are pivotally connected to the collars 81 are drawn inwardly and the feet 87ª thereof are depressed. As these feet are connected to the ends of the bell crank levers 79 the ends of the bell crank levers connected to the free ends of the divided bands 76 are turned into such a position as to contract the divided portions of the bands against the rims 71, thus throwing the friction clutch into engagement and consequently as the collars 81 are keyed to the axle 45 the wheels will be revolved with such frictions. The above description covers the operation of the front friction clutches 29 and 30 connected respectively to the left and right hand wheels 28. At the same time as the front friction clutches 29 and 30 are drawn into engagement the rear friction clutches 26 and 27 connected respectively to the left and right hand rear wheels 3 are thrown into engagement as the lower rods 103 and 104 are drawn forwardly. When this takes place the inner ends of the rear forked arms 84ª are drawn forwardly and the collars 81ª drawn inwardly. This operation throws the rear friction clutches 26 and 27 into engagement in the manner already described for the front friction clutches, as it has been stated above that the construction of the rear friction clutches 26 and 27 is identical with the construction of the front friction clutches 29 and 30. These friction clutches are operated as described above where it is desired to throw all wheel friction clutches into engagement in unison when it is desired that the tractor proceed in a straight path. When it is desired that the tractor make a turn to the left, assuming the levers 105 and 109 to be in the inoperative position, the spring actuated pawl 113 of the lever 105 is released from the teeth 112ª of the quadrant 112, and this lever 105 is thrown over into the position shown in Fig. 6. When this takes place the extension 107 thereof is drawn upwardly and consequently by means of the connecting rod 108 the lever 101 is turned upwardly thereby turning the bush ing 96. When this takes place the upper and lower rods 103 are drawn rearwardly and forwardly respectively which draws backward and forward the inner ends of the forked arms 84 and 84ª respectively. Consequently the front and rear right hand collars 81 and 81ª are drawn inwardly which draws the friction clutches 30 and 27 into engagement, thus transmitting power to the front and rear right hand wheels 28 and 3. The lever 109 is retained in the inoperative position shown in Fig. 6 by the spring actuated pawl engaging the toothed quadrant 115, and therefore the front and rear friction clutches 29 and 26 remain inoperative and no power is transmitted to the left hand front and rear wheels 28 and 3.

When it is desired to make a right hand turn, assuming that both levers 109 and 105 are in the inoperative position the spring actuated pawl 113 is first released from the teeth 112ª of the toothed quadrant 112. The spring actuated pawl 114 is then released from the toothed quadrant 115 and the lever 109 thrown over which turns the extension 110 thereof upwardly thus throwing the lever 102 by means of the connecting rod 111 into the upward position turning the bushing 92 which draws the upper and lower rods 104 respectively rearwardly and forwardly, and as these upper and lower rods 104 are respectively connected to the inner ends of the forked arms 84 and 84ª the inner ends of these arms will be drawn respectively rearwardly and forwardly, thus drawing the left hand collars 81 and 81ª inwardly and consequently throwing the left hand friction clutches 29 and 26 into an operative position. When this takes place the left hand front and rear wheels 28 and 3 are thrown into an operative position with the front axle 45 and the rear axle 5, and consequently are rotated therewith.

Figure 1:
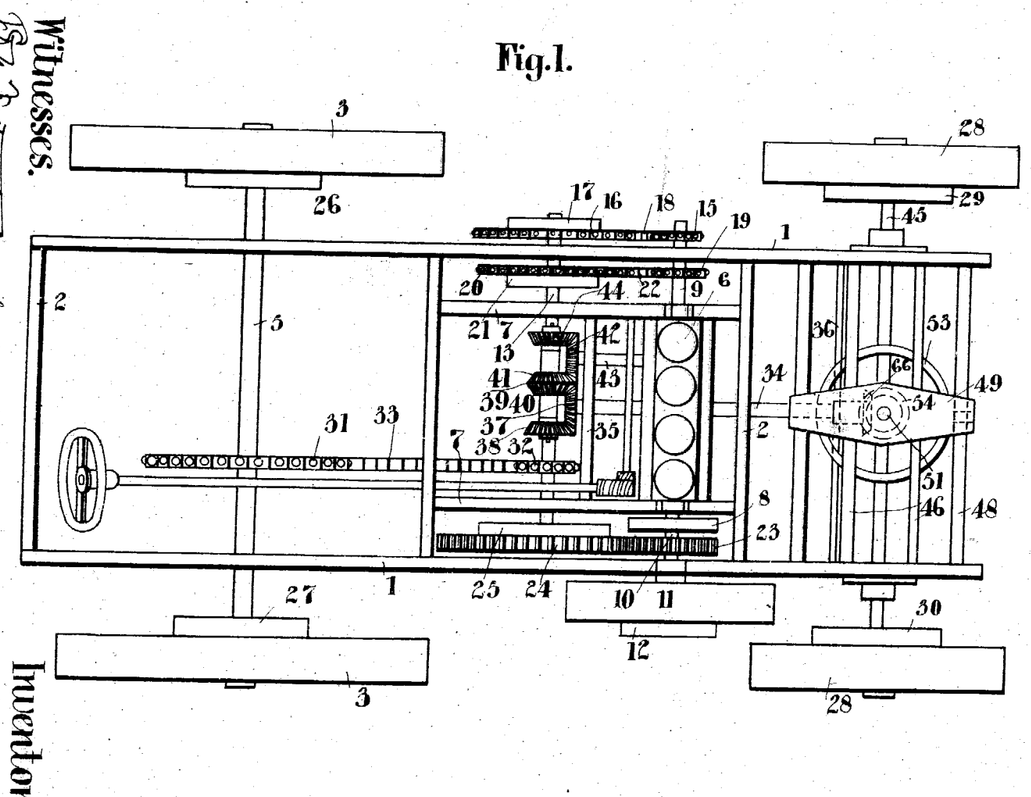
Figure 1 represents a plan view of a tractor showing my device applied thereto.
Figure 2:
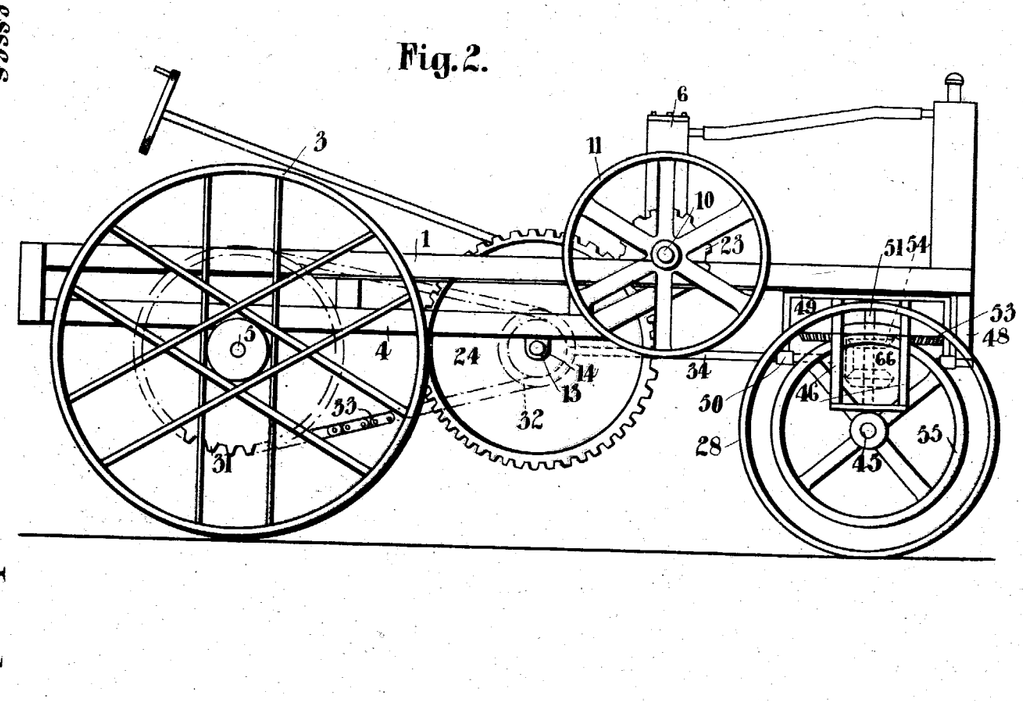
Fig. 2 is a side elevation thereof.
Figure 3:
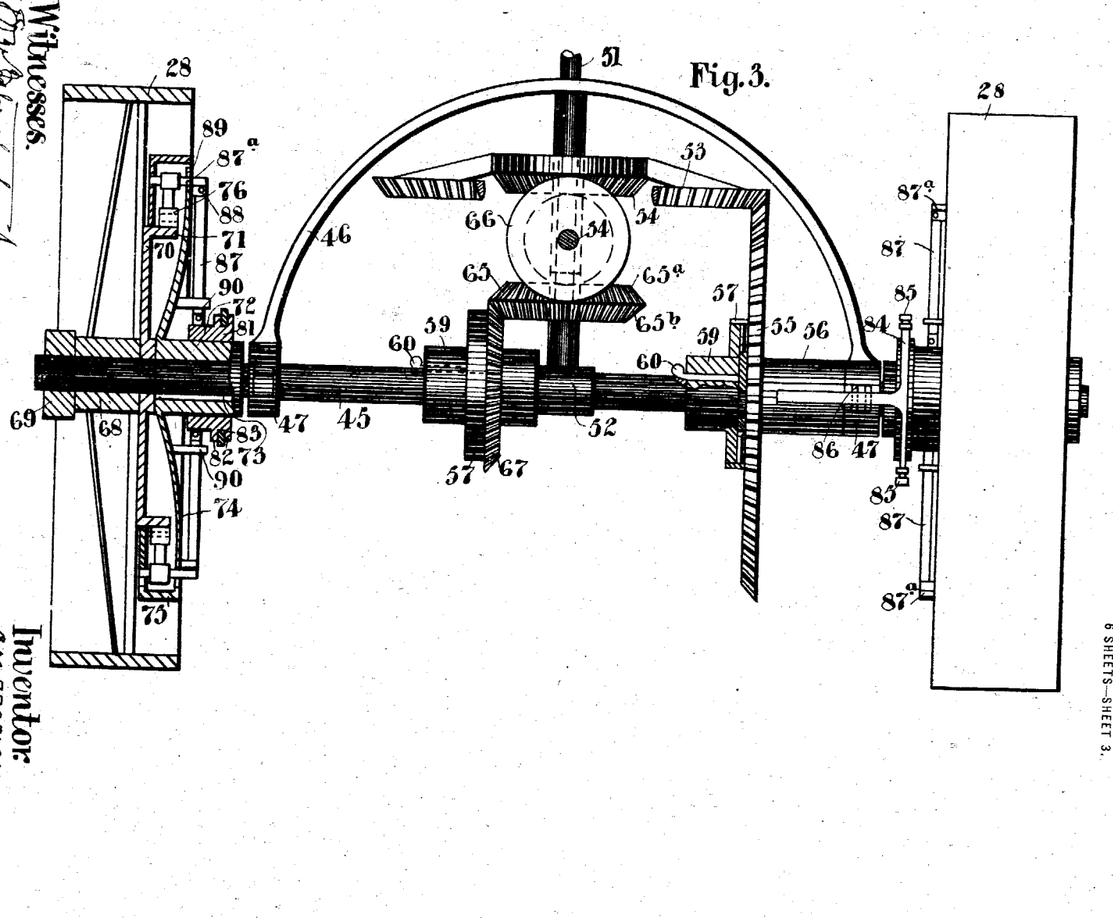
Fig. 3 is an elevational view of the front axle taken from the rear thereof showing the left hand wheel in section.
Figure 4:
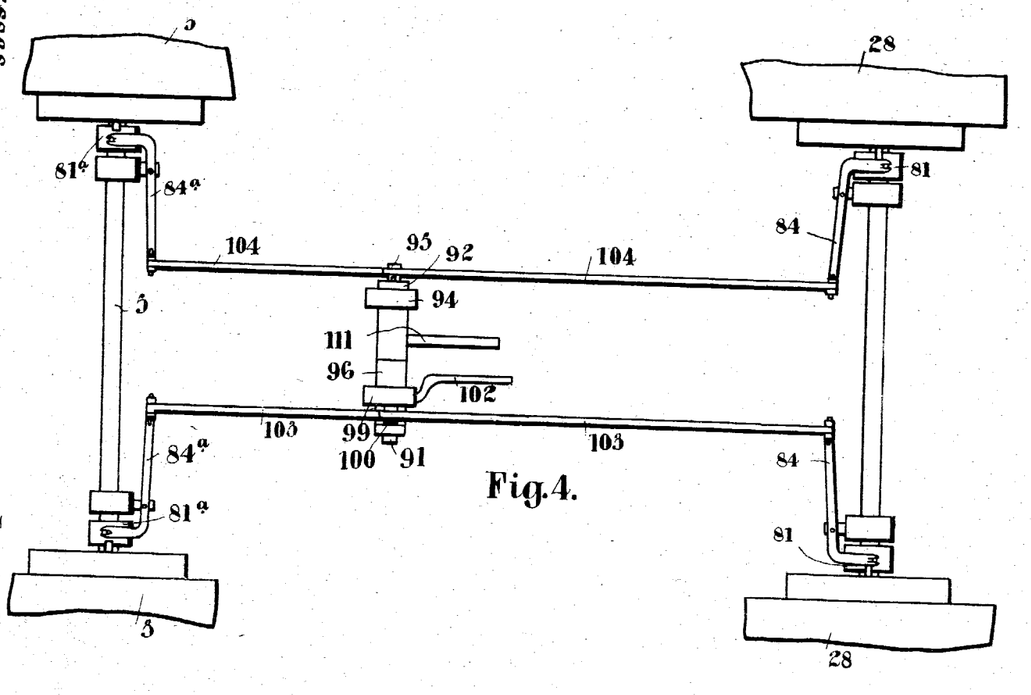
Fig. 4 is a plan view showing the means for controlling the clutch mechanism on the wheels.

I have now described the means of operating the tractor in a straight path as well as the manner in which the controlling levers are manipulated when it is desired to turn to the left or to the right as occasion demands. The description relates so far to the means of transmitting power to the wheels from the front and rear axles 45 and 5 respectively. I will now describe the means of transmitting power from the engine 6 to the front and rear axles 45 and 5. I will first consider the means of transmitting power to the front axle 45. The engine 6 is, as already described, mounted crosswise of the frame and has the extending shafts 23 and 9 connected thereto. The shaft 9 has a variable speed connection to the cross shaft 13. In the present instance it is possible to obtain two speeds, the low speed consisting of the sprocket 15 and the sprocket 16 connected by the chain 18, and the high speed consisting of the sprocket 19 and the sprocket 20 connected by the chain 22. As has already been stated the sprockets 15 and 19 are keyed to the shaft 9 and the sprockets 16 and 20 releasably connected to the cross shaft 13 by the friction clutches 17 and 21 respectively. Assuming that the engine is run in a clockwise direction the shaft 13 will also operate in a clockwise direction. Now as has already been described the bevel gear 38 is keyed to the cross shaft 13 and this gear is revolved in a clockwise direction. As this bevel gear 38 is in mesh with the bevel gear 37 it will be revolved in a counter clockwise direction. Now this gear 37 is keyed to the shaft 34 and consequently this shaft 34 will be revolved in a counter clockwise direction as viewed from the front, or in a clockwise direction as viewed from the rear. The front of the shaft 34 is provided with a bevel gear 66 and reference is now made to Fig. 3 of the drawing which shows the front axle from the rear. This gear will be revolved in a clockwise direction. Consequently as this gear 66 is in mesh with the bevel gear 54 free on the vertical shaft 51, the gear 54 will be rotated toward the right. As the gear 54 is formed integrally with the gear 53, the gear 53 will be turned toward the right, and as the gear 53 is in mesh with the gear 55 which is connected to the axle 45 by the ratchet mechanism already described, the gear 55 will rotate the axle in a forward direction. The upper face 65ª of the gear 65 which is free on the vertical shaft 51 is also in mesh with the gear 66, and consequently this former gear is driven in a counter clockwise direction, and as the gear 67 is in mesh with the lower face 65ᵇ of the gear 65 and as it is connected by the ratchet mechanism above described to the axle 45, the axle will also be driven in a forward direction by this gear 67.

I will now describe the driving connection to the rear axle 5. This consists of a sprocket 32 keyed to the cross shaft 13 and a sprocket 31 keyed to the rear axle 5 and connected by a chain 33.

The tractor is reversed in the following manner:—A pinion 23 which is keyed to the extending shaft 10 revolves in a clockwise direction and consequently rotates the gear 24 which is releasably connected to the shaft 13 in a counter clockwise direction, thus rotating the cross shaft 13 in a counter clockwise direction and reversing the direction of the chain 33, thus driving the rear wheels in a rearward direction.

In order to more evenly distribute the power on the cross shaft 13 the bevel gear 44 is provided and keyed thereto. This bevel gear meshes with the bevel gear 42 on the stub shaft 43 and the latter gear also meshes with a face 41 of the double faced gear freely mounted on the shaft 13. The other face 40 of the double faced gear meshes with the bevel gear 37. As the shaft 13 normally revolves in a clockwise direction, and the gear 37 in a counter clockwise direction as viewed from the front the inter-meshing gear 41 revolves in a clockwise direction. The face 41 will also be revolved in a clockwise direction and the gear 42 revolved in a counter clockwise direction being revolved by the intermeshing gear 44 which is revolved in a clockwise direction.

I will now set forth the manner of operating the change of speeds. Assuming that it is desired for the tractor to proceed in the forward direction on low speed the friction clutch 17 is thrown into engagement, and consequently the sprocket 16 will be rigidly connected to the shaft 13. This shaft will now be revolved at a low speed by the chain 18 which is connected to the sprocket 15 on the extension shaft 9 which in turn is connected to the engine shaft. Consequently power at a low speed will be transmitted through the sprockets 32 and 31 by the chain 33 to the rear axle and also by the shaft 34 through the gears on the front axle thereto. Of course it is to be understood that after throwing in the friction clutch 17 the friction clutches 26 and 29, 27 and 30 are then thrown into engagement as above described for transmitting power to the wheels. When it is desired to proceed on high speed the friction clutch 17 is released and the friction clutch 21 thrown into engagement. As the sprocket 19 is of larger diameter than the sprocket wheel 15 and the sprocket wheel 20 of smaller diameter than the sprocket wheel 16, the shaft 13 will be consequently driven at a higher speed, and thus power will be transmitted to the rear and front axles as set forth above, but at a higher speed. I have shown only one speed for reversing the tractor, as this is ordinarily deemed sufficient, but in the event of two speed reversals being required it would only be necessary to insert a further set of gears similar to the gears 24 and the pinion 23.

It is also to be understood that in making a turn to the right or to the left, as the case may be, the friction clutches 17 or 21 are thrown in in the ordinary manner, whereas the power to the wheels is controlled by the engagement on the wheel friction clutches.

As has already been stated the pulley wheel 11 is releasably connected to the shaft 10 by the friction clutch 12. The reason of the insertion of this friction clutch is that ordinarily when the tractor is in motion it is not desirable to rotate this pulley wheel and consequently under normal conditions it remains stationary, as the clutch 12 is out of engagement. However where the tractor is used in connection with a thresher or for some similar machine, this friction clutch can be thrown in and the pulley wheel 11 revolved for operating the thresher or other such machine.

I provide the yoke 49 in order that when the front wheels are driving over uneven ground this yoke which is connected in the manner already described will permit of the tilting of either of the front wheels. I will now describe the ratchet mechanism connected to the gears 55 and 67 respectively and would also indicate for what purposes these ratchet mechanisms are intended. Both ratchet mechanisms are identical in construction and consequently it will be sufficient to point out the operation of one. When the vehicle is proceeding in a straight path the pawls 63 which are pivotally connected to the annular portion 61 which in turn is keyed to the front axle 45 are held in engagement with the teeth 58 in the hollow boss 57 which is secured to either of the gears 55 or 67. Consequently the power is transmitted from these gears to the front axle. Should however the front axle be turned and should the vehicle for instance be turned to the left the right hand wheel and as has already been described the right hand friction clutch 30 will be in engagement with this wheel. Consequently the axle will revolve faster than the gear 55 and therefore the pawls 63 will slip on the teeth 58 and no power will be given by this gear, the power in this instance being given by the gear 67. Should the vehicle be turned to the right the other ratchet will slip and consequently the gear 67 will transmit no power, whereas the gear 55 will take up the load. Further when the device is reversed both sets of pawls slip on the teeth and consequently no power will be given by the gear 67 and the gear 55 to the front axle, this axle remaining inoperative until the device is operated in the forward direction again. While I have not described specifically the construction of the friction clutches 12, 17, 21 and 25 it is to be understood that they are operated in the same manner as the wheel friction clutches and are identical in construction. From the above description it will be seen that I have evolved a four wheel transmission device for tractors in which the right and left hand frictions can be operated independently or in unison. I have also constructed a transmission device which can be operated at variable speeds or in a reverse direction as well as applying the power to the front wheels at the same time retaining the advantages of turning the front axle instead of having a fixed front axle with the wheels connected thereto by the ordinary knuckle joints.

Many modifications may be made in the invention without departing from the spirit of the same or the scope of the claims and the form shown is to be taken in an illustrative and not in a limiting sense.

What I claim as my invention and desire to secure by Letters Patent is:—

1. In a transmission device for tractors, the combination with revoluble front and rear axles and wheels freely mounted thereon, of friction clutches constituting a releasable connection between each wheel and the axle thereof, a cross shaft, means for driving the cross shaft at a variable speed from the engine, a sprocket on the cross shaft, a sprocket on the rear axle, a chain connecting the two sprockets together, a bevel gear on the cross shaft, a suitably supported longitudinal and forwardly extending shaft, a bevel gear on the rear end of the longitudinal shaft meshing with the aforesaid gear, and means connecting the longitudinal shaft with the front axle for driving the same.

2. In a transmission device for tractors, the combination with revoluble front and rear axles and wheels freely mounted thereon, of friction clutches constituting a releasable connection between each wheel and the axle thereof, a cross shaft, means for driving the cross shaft at a variable speed from the engine, a sprocket on the cross shaft, a sprocket on the rear axle, a chain connecting the two sprockets together, a bevel gear on the cross shaft, a suitably supported longitudinal and forwardly extending shaft, a bevel gear on the rear end of the longitudinal shaft meshing with the aforesaid gear, a boxing freely mounted on the front axle, a suitably supported vertical shaft rotatably mounted at its lower end in said boxing, a large bevel gear keyed thereto, a small bevel gear formed integrally with the large bevel gear, a bevel gear on the forward end of the longitudinal shaft meshing with the small bevel gear on the vertical shaft, a double faced bevel gear freely mounted on the vertical shaft, a bevel gear freely mounted on the axle, means for normally connecting the front axle with the bevel gear, said bevel gear meshing with the lower face of the double gear, and the upper face thereof meshing with the bevel gear on the forward end of the longitudinal shaft, a large bevel gear freely mounted on the axle, means for normally connecting the large gear with the axle, said large gear on the axle meshing with the large gear on the vertical shaft.

3. In a transmission device for tractors, the combination with revoluble front and rear axles and wheels freely mounted thereon, of independent friction clutches constituting a releasable connection between each wheel and the axle thereof, each friction clutch comprising a rim suitably secured to the wheels, a divided friction band engaging the rim upon being contracted, means for connecting the friction band to the axle for revolving the same therewith, and means for contracting and expanding the band.

4. In a transmission device for tractors, the combination with revoluble front and rear axles and wheels freely mounted thereon, of independent friction clutches constituting a releasable connection between each wheel and the axle thereof, each friction clutch comprising a rim suitably secured to the wheel, a divided friction band engaging the rim upon being contracted, a bushing secured to the axle having outwardly extending arms for supporting the divided band, a collar slidably mounted on said bushing, suitable connections between the collar and the divided band, said divided band being contracted upon the collar being moved away from the wheel and expanded upon it being moved toward the wheel.

5. In a transmission device for tractors, the combination with revoluble front and rear axles and wheels freely mounted thereon, of independent friction clutches constituting a releasable connection between each wheel and the axle thereof, each friction clutch comprising a rim suitably secured to the wheel, a divided friction band engaging the rim upon being contracted, a bushing secured to the axle having outwardly extending arms, one end of each divided portion pivotally connected to each arm, a bell crank lever mounted on each arm, the inner end of each bell crank lever pivotally connected to the free end of each divided band, a collar slidably mounted on said bushing, L-shaped levers pivotally connected at their inner ends to the slidable collar and pivotally connected to the outwardly extending arms, the feet of the levers extending through the arms and suitably connected to the free ends of the bell crank levers.

6. In a transmission device for tractors, the combination with a suitably supported revoluble front axle, of a boxing freely mounted thereon, an arched frame having bearing portions, the axle extending through the bearing portions, a vertical shaft, the lower end rigidly mounted in the boxing and the upper end extending freely through the arched frame, a large bevel gear free on the vertical shaft, a small bevel gear formed integrally therewith, a large bevel gear freely mounted on the axle and meshing with the aforesaid bevel gear on the vertical shaft, a ratchet connection between the axle and the freely mounted bevel gear thereon, a double faced bevel gear freely mounted on the vertical shaft, a bevel gear freely mounted on the axle and meshing with the lower face of the double bevel gear, a ratchet connection between the freely mounted bevel gear, and the axle, a longitudinal shaft extending rearwardly from the front axle, a bevel gear on the forward end thereof meshing with the small bevel gear on the vertical shaft and with the upper face of the double bevel gear.

7. In a transmission device for tractors, the combination with a suitably supported revoluble front axle, of a boxing freely mounted thereon, an arched frame having bearing portions, the axle extending through the bearing portions, a vertical shaft, the lower end rigidly mounted in the boxing and the upper end extending freely through the arched frame, a large bevel gear free on the vertical shaft, a small bevel gear formed integrally therewith, a large bevel gear freely mounted on the axle and meshing with the aforesaid bevel gear on the vertical shaft, a ratchet connection between the axle and the freely mounted bevel gear thereon, a double faced bevel gear freely mounted on the vertical shaft, a bevel gear freely mounted on the axle and meshing with the lower face of the double bevel gear, a ratchet connection between the freely mounted bevel gear and the axle, a longitudinal shaft extending rearwardly from the front axle, a bevel gear on the forward end thereof meshing with the small bevel gear on the vertical shaft and with the upper face of the double bevel gear, and a yoke extending over the arched frame, the vertical shaft extending therethrough, said yoke having depending ends, the rear depending end having a bearing portion extending around the longitudinal shaft and the forward depending end pivotally connected to the frame of the tractor.

8. In a transmission device for tractors, the combination with the frame and engine mounted crosswise thereof, of extending shafts connected to both ends of the crank shaft of the engine, of a cross shaft journaled to the frame, a low speed sprocket, a friction clutch releasably connecting the low speed sprocket to the cross shaft, a low speed sprocket secured to one of the extending shafts, a chain connecting the two low speed sprockets together, a high speed sprocket, a friction clutch releasably connecting the high speed sprocket to the cross shaft, a high speed sprocket secured to the same extending shaft, a chain connecting the two high speed sprockets together, a gear, a friction clutch releasably connecting the gear to the cross shaft, a pinion secured to the other extending shaft and meshing with the aforesaid gear, revoluble front and rear axles, wheels freely mounted thereon, friction clutches on each wheel releasably connecting the same to the axle, a driving sprocket on the cross shaft, a sprocket on the rear axle, a chain connecting the two sprockets together, a bevel gear secured to the cross shaft, a suitably supported longitudinal and forwardly extending shaft, a bevel gear on the rear end thereof meshing with the aforesaid bevel gear on the cross shaft, and means connected to the longitudinal shaft at its forward end for forming a driving connection between it and the front axle.

9. In a transmission device for tractors, the combination with revoluble front and rear axles and friction clutch controlling collars mounted thereon, of rings freely mounted on the collars, suitably fulcrumed forked levers having slots in the ends of the forks, pins extending through the slots into the rings, a suitably mounted cross shaft, independent bushings, one keyed thereto and the other free thereon, upper and lower outwardly extending arms formed on the bushings, rods pivotally connecting the upper arms with the inner ends of the forward forked levers, rods pivotally connected at their forward ends to the lower arms and pivotally connected at their rear ends to the inner ends of the rear forked levers, forwardly extending levers mounted on the independent bushings, and means connected to the levers for turning the bushings in unison.

10. In a transmission device for tractors, the combination with revoluble front and rear axles and friction clutch controlling collars mounted thereon, of rings freely mounted on the collars, suitably fulcrumed forked levers having slots in the ends of the forks, pins extending through the slots into the rings, a suitably mounted cross shaft, independent bushings, one keyed thereto and the other free thereon, upper and lower outwardly extending arms formed on the bushings, rods pivotally connecting the upper arms with the inner ends of the forward forked levers, rods pivotally connected at their forward ends to the lower arms and pivotally connected at their rear ends to the inner ends of the rear forked levers, forwardly extending levers mounted on the independent bushings, and means connected to the levers for turning the bushings independently.

11. In a transmission device for tractors, the combination with revoluble front and rear axles and friction clutch controlling collars mounted thereon, of rings freely mounted on the collars, suitably fulcrumed forked levers having slots in the ends of the forks, pins extending through the slots into the rings, a suitably mounted cross shaft, independent bushings, one keyed thereto and the other free thereon, upper and lower outwardly extending arms formed on the bushings, rods pivotally connecting the upper arms with the inner ends of the forward forked levers, rods pivotally connected at their forward ends to the lower arms and pivotally connected at their rear ends to the inner ends of the rear forked levers, forwardly extending levers mounted on the independent bushings, and means connected to the levers for turning the bushings independently and in unison.

12. In a transmission device for tractors, the combination with revoluble front and rear axles and friction clutch controlling collars mounted thereon, of rings freely mounted on the collars, suitably fulcrumed forked levers having slots in the ends of the forks, pins extending through the slots into the rings, a suitably mounted cross shaft, independent bushings, one keyed thereto and the other free thereon, upper and lower outwardly extending arms formed on the bushings, rods pivotally connecting the upper arms with the inner ends of the forward forked levers, rods pivotally connected at their forward ends to the lower arms and pivotally connected at their rear ends to the inner ends of the rear forked levers, forwardly extending levers mounted on the independent bushings, a suitably pivoted lever having an offset extension, a rod pivotally connected at one end to the offset extension and at the other end to the forwardly extending lever on the freely mounted bushing, a second lever having an offset extension, a rod pivotally connected at one end to the offset extension and at the other end to the forwardly extending lever on the bushing keyed to the shaft, a toothed quadrant, a spring actuated pawl on the second lever engaging the teeth of the toothed quadrant, a second toothed quadrant secured to the second mentioned lever and a spring actuated pawl on the first mentioned lever engaging the teeth of the toothed quadrant on the second mentioned lever.

13. In a transmission device for tractors, the combination with a revoluble front axle, of driving gears freely mounted thereon and ratchet connections between the driving gears and the axle, each comprising a hollow boss secured to the corresponding gear and having a toothed interior, an annular portion secured to the axle, pivoted pawls on the annular portion, and springs normally holding the pawls in engagement with the teeth of the hollow boss.

In testimony whereof, I have signed at the city of Hamilton, in the county of Wentworth, in the Province of Ontario, Canada, this 12th day of March, 1914.

GEORGE MAHLON ABSALOM.

Witnesses:
J. E. M. FETHERSTONHAUGH,
E. M. NEAME.